Dec. 28, 1937. T. A. MILUTIN 2,103,688
BRAKE ADJUSTING TOOL
Filed July 3, 1935 3 Sheets-Sheet 1
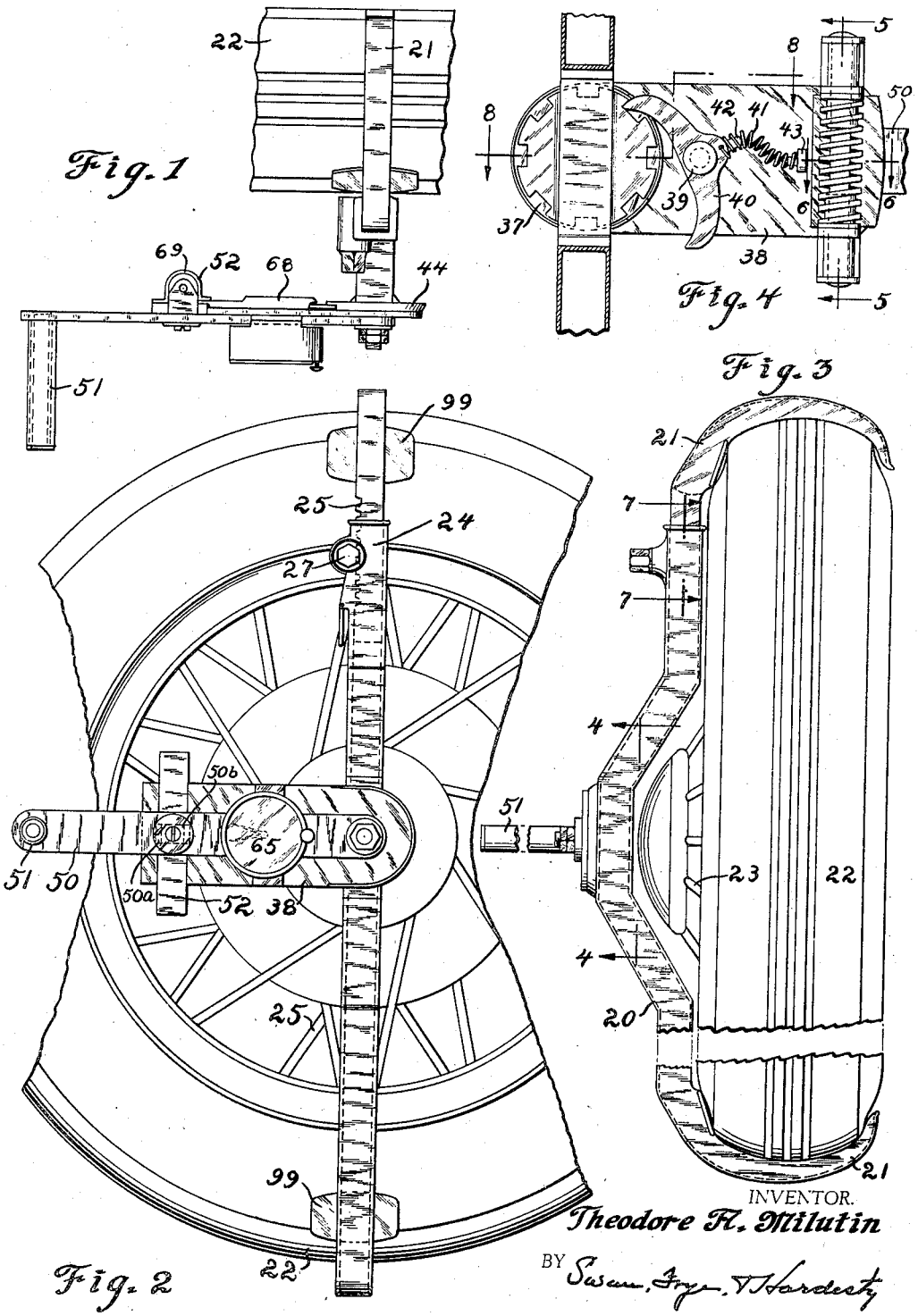
INVENTOR.
Theodore A. Milutin
BY Swan, Frye, & Hardesty
ATTORNEYS.

Dec. 28, 1937.  T. A. MILUTIN  2,103,688
BRAKE ADJUSTING TOOL
Filed July 3, 1935  3 Sheets-Sheet 2
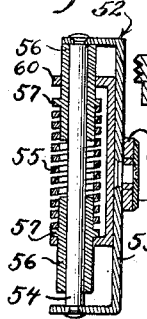
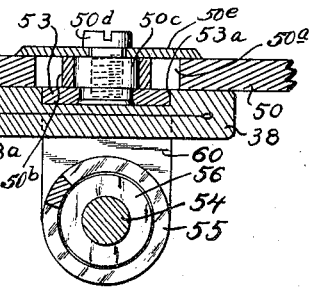
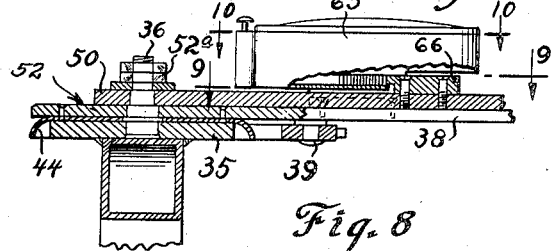
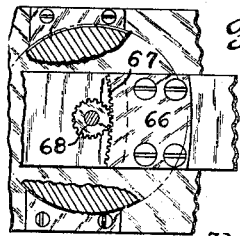
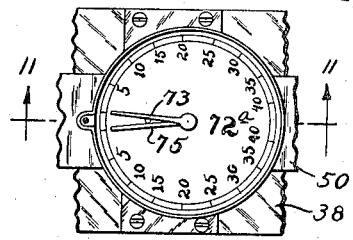
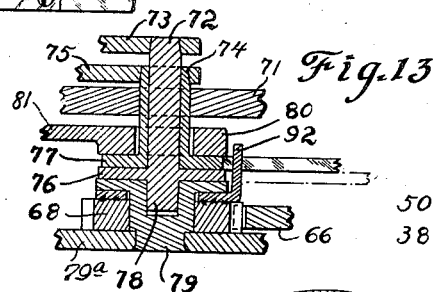
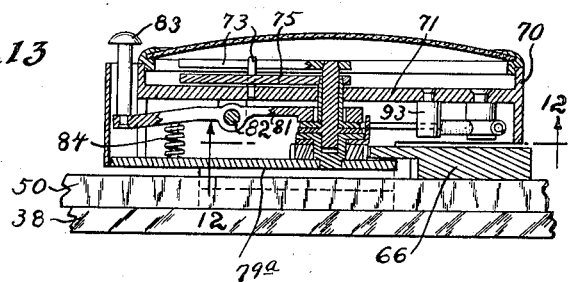
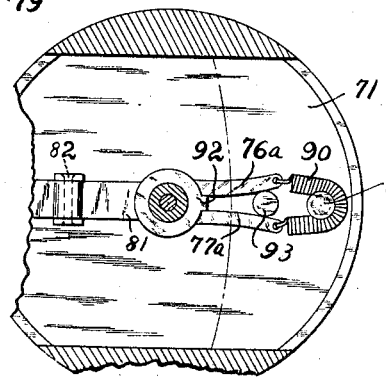
INVENTOR.
Theodore A. Milutin
BY
Swan, Frye & Hardesty
ATTORNEYS.

Dec. 28, 1937.   T. A. MILUTIN   2,103,688
BRAKE ADJUSTING TOOL
Filed July 3, 1935   3 Sheets-Sheet 3
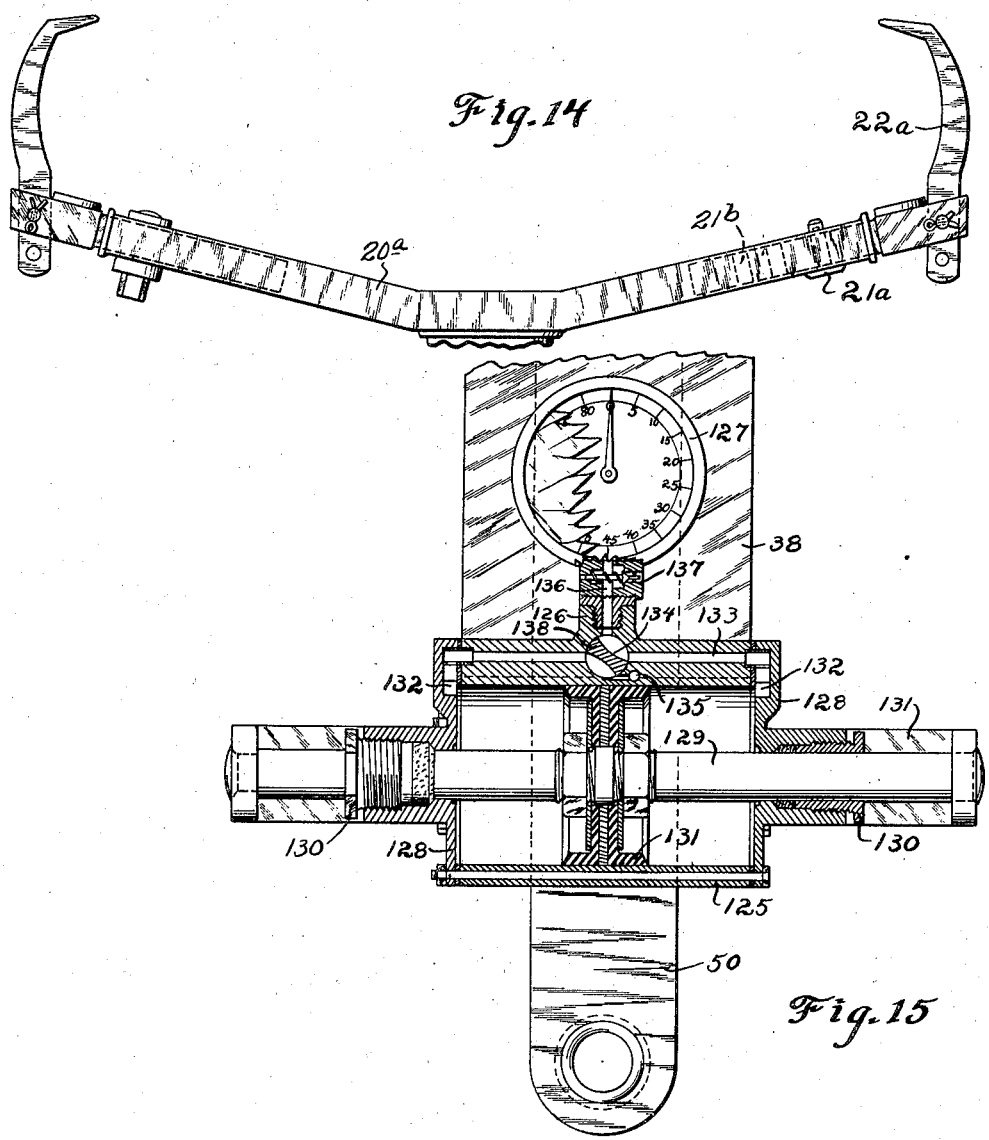
INVENTOR.
Theodore F. Milutin
BY
Swan, Frye, & Hardesty
ATTORNEYS.

Patented Dec. 28, 1937

2,103,688

UNITED STATES PATENT OFFICE 2,103,688

BRAKE ADJUSTING TOOL

Theodore A. Milutin, Dearborn, Mich.

Application July 3, 1935, Serial No. 29,596

4 Claims. (Cl. 265—1)

The present invention relates to devices or tools which are intended to be used in the adjusting of the brakes of motor vehicles.

Among the objects of the invention is a device of this character which may be easily and quickly secured to the wheel of a vehicle and the wheel rotated by means which indicates the force required to cause such rotation.

Another object is a device of the kind indicated which may be used in succession on each of the wheels of the vehicle, and an accurate comparison made of the amount of force necessary to rotate each of them with the brakes applied.

Another object is a device of the character indicated which may be used on either the right or left wheel of a pair without interfering with the accurate comparison of the force necessary to turn the wheel.

Another object is a device indicated which shall be simple in construction and efficient in its use.

Other objects and advantages will be apparent to those skilled in the art upon reference to the following description and the accompanying drawings in which Figure 1 is a plan view of the device affixed to a vehicle wheel only part of which is shown in the figure.

Figure 2 is an elevation of the device in position to use on a wheel with part of the latter broken away.

Figure 3 is a side elevation of the device as shown in Figure 2.

Figure 4 is a sectional view taken on the line 4—4 of Figure 3.

Figure 5 is a sectional detail view of the loading spring.

Figure 5a is a similar view to Figure 5 but with parts in a different position.

Figure 6 is a sectional view taken on the line 6—6 of Figure 4.

Figure 7 is a partial sectional view taken on the line 7—7 of Figure 3.

Figure 8 is a section on line 8—8 of Figure 4.

Figure 9 is a sectional view of the gauge taken on line 9—9 of Figure 8.

Figure 10 is a section of the gauge on line 10—10 of Figure 8.

Figure 11 is a vertical central sectional view of the gauge on line 11—11 of Figure 10.

Figure 12 is a section on line 12—12 of Figure 11.

Figure 13 is an enlargement of a portion of Figure 11.

Figure 14 is a partial view of a modified form of the wheel embracing portion.

Figure 15 is a sectional view of a modified form of resilient resistance using air as the resilient means.

Referring particularly to Figures 1 to 4, it will be noted that the device comprises a yoke portion 20 having its ends 21 curved to fit over the tread of a tire 22 and mounted on a suitable wheel 23, and one or both of the yoke arms may be provided with means for adjusting the yoke length and permitting the clamping of the yoke on the wheel. Such a device is indicated as a whole at 24. The preferred form of this adjusting means consists of a rack 25 formed on one of the curved end pieces 21 sliding within the tubular body of the yoke and cooperating with a gear 26 carried on a suitable shaft provided with a hexagonal extension 27 by means of which the gear may be rotated.

As shown in Figure 7, the gear 26 is maintained against rotation in one direction by means of a spring-pressed pawl member 28 pivoted at 26 and serving as a guard therefore. Reference to Figure 7 which shows a section of the device on an enlarged scale shows that the gear 26 will easily rotate in the direction providing inward movement of the part 21 but prevent outward movement thereof unless the pawl 28 is lifted.

At the central portion of the yoke, 20, which may be bowed outwardly in order not to interfere with the wheel hub, is fixed, preferably by welding, a circular bearing plate 35, notched as at 37 (see Fig. 4) and having a central stud 36 on which is rotatably mounted an anchor plate 38 on the underside of which is pivoted as at 39 a two-way pawl 40. This pawl 40 is held in one of the notches 37 by a suitable spring 41 mounted under compression in line with the pivot 39 and carried between the pin 42 formed on the pawl, and a suitable abutment 43. It is, further, desirable to interpose between plates 35 and 38 a brass bearing plate 44, which may be fixed to plate 38 and cut away to allow the pawl action.

Also rotatably mounted on stud 36 is a crank member 50 comprising a flat lever portion provided with a suitable handle 51. Crank 50 may be maintained on the stud by means of suitable nuts 52a. While the crank 50 is so mounted as to be moved relatively to plate 38, it is restrained against such motion by a resilient element such as the spring device indicated at 52 in Figures 1 and 2 and shown more in detail in Figures 5, 5a, and 6. This spring device comprises a yoke member 53 fixed to the crank 50 and embracing between its two arms a rod 54. Surrounding the rod 54 is a spring 55 and slidably mounted on the rod 54 are two bushings 56 each having a flange 57 against which the spring ends abut. Carried by the plates 38 is another yoke 60 of which the arms embrace the two bushings 56 on the side of the flange 57 opposite the spring 55.

Figures 2 and 6 show best the connection of the yoke 53 to the crank arm 50, and the provision for a small amount of rotative and longitudinal movement. In these figures it will be noted that the arm 50 is provided with a rectangular slot 50a in which a block 50b may slide longitudinally. This block 50b is rotatably carried on a pin 50c riveted to the yoke 53 and is bored and tapped to receive a screw 50d serving to hold in place the cover plate 50e. The screw and plate also serve to hold these several parts together.

Further, the yoke 53 preferably slides in a suitable guide 53a cut transversely of the end of plate 38, and the latter may be folded back on itself as shown at 38a in order to increase its stiffness in this portion.

It will readily be seen that any relative motion between the crank 50 and the plate 38 in either direction will tend to deform the resilient resistance element, i. e. compress the spring 55, and through such resilient resistance move the plate 38, and thereby the wheel, against the brake resistance.

Figure 5 shows the several parts in rest or central position, while Figure 5a shows the parts after relative movement between the crank and plates.

Also carried on crank arm 50 is a small plate 66, the edge of which toward the stud 36 is provided with gear teeth as shown in Figure 9 at 67. This portion 67 of an internal gear or curved rack will have its center at the center of the stud 36, and cooperates with a small gear 68 forming a part of a gauge 65 carried by plate 38 as indicated clearly in Figs. 9 and 10, so that any relative movement between the arm 50 and the plate 38 will be indicated.

In Figure 1 the pawl 40 and the spring 65 and its allied parts are shown as being provided with suitable covers 68 and 69.

The gauge construction is shown more particularly in Figures 9 to 13 and in these figures there is shown a frame or housing 70 having a top plate 71 upon which may be mounted a suitable dial 72a. This plate 71 is perforated at its center and through the perforation extends a shaft 72 carrying a hand 73 and telescoped within a hollow shaft or sleeve 74 also carrying a hand 75. Both the shaft 72 and the sleeve 74 are provided with a disc portion at their lower ends, these being numbered 76 and 77 respectively, while the shaft 72 is provided with a lower extension 78 having a bearing within a cup member 79 fixed in a base plate 79a upon which the housing 70 is suitably mounted.

Also surrounding the sleeve 74 and shaft 72 is a brake disc 80 carried on the end of a lever arm 81, which arm is pivoted as at 82 to the plate 71, and operable by means of a button 83, against a spring 84. This brake disc 80 is adapted to press the two disc portions 76 and 77 together and hold them through friction against turning.

Each of the two disc portions 76 and 77 is provided with a laterally extending arm 76a—77a respectively, the two arms 76a—77a being at their outer ends attached to the two ends of a single spring 90 which extends over a fixed pin 91 and in this fashion both arms are provided with exactly the same spring resistance when the operating mechanism attempts to turn the arms and therefore the indicating hands.

The two arms 76a—77a are rotated, one or the other, depending upon the direction of relative movement between the crank 50 and plate 38, and this is accomplished through the gear 68 having fixed thereto a small finger 92 which lies between the two arms. It will be readily seen that rotation of the gear 68 in clockwise direction (Figure 12) will move arm 77a and therefore the indicating hand 73, whereas rotation in the opposite direction will move the arm 76a and therefore the hand 75 thereby indicating not only the amount but the direction of movement. In idle position the two arms rest against a suitable stop 93. When either hand has been moved, the pressure of the brake disc 80 will maintain it in indicating position against the pull of spring 90, but upon the release by means of the button 83, the hand will immediately turn back to zero position as indicated in Figure 10.

In place of the spring device 52 and the gauge 65 the resilient device may be pneumatic as shown in Figure 15 and the developed air pressure indicated on a conventional pressure gauge of the type used for indicating tire pressures. As indicated in Figure 15 this form of device may comprise a barrel 125 fixed to plate 38 in any suitable fashion and carrying a boss 126 upon which is mounted a gauge 127. The barrel 125 will be closed at both ends with the heads 128 which will be provided centrally with passages for a through piston rod 129 and suitable glands 130. The piston rod will be carried by a yoke 131 mounted in suitable fashion on crank arm 50 as has already been described for the mounting of yoke 53.

At the center of rod 129, is a two way piston 131 and in each head 128 is a passage 132 connected to a longitudinal passage 133 formed in the outer portion of barrel 125. This passage 133 is provided at its midportion at the base of boss 126 with a valve chamber 134 from which, at the bottom, leads a vent opening 135. From the top of the chamber 134 a passage 136 leads up through boss 126 to the gauge 127 and between the chamber 134 and gauge 127 a small inlet valve 137 is located. Operating in chamber 134 is a valve member 138 which in the position shown connects the right hand end of the barrel with the gauge and connects the left hand end of the barrel with the vent 135. In its other position the valve reverses these connections.

In the use of this device, it is preferred to always fill the compression end of the barrel by moving the piston to the other end before compression. This will result in more accurate comparative pressure readings.

In operating the device for brake adjustment, it will of course be necessary to apply the brakes with a suitable pressure and maintain that pressure constant while the testing and adjustment is accomplished. This may be done through the use of any suitable pressure holding means.

The pawl 40 is then moved to prevent rotation of the plate 38 in the forward direction of the wheel and force is applied to the crank 50 in a direction to cause such wheel rotation.

With the brakes applied, there will of course be considerable resistance to such turning and such resistance will be indicated by the gauge 65 on the dial 72. The operator then applies the tool to the opposite wheel and by reversing the pawl may reverse the direction of force application on crank 50, so as to indicate the amount of force required to overcome brake resistance on that wheel, the amount of force being indicated on the dial by the other of the two hands. He may then adjust the brakes on the two wheels so that they will be equal in braking action. In order to prevent rocking of the yoke member 20 on the wheel periphery suitable pads 99 may be provided near the ends of the yoke.

A somewhat modified form of the tool is shown in Figure 14. In this form the yoke 20a is shown as provided with both ends adjustable, one end through the movable pin 21a and perforated shank 21b entering the tubular arm of yoke 20a, and the other end through a suitable contracting means such as is indicated in Figure 7. In this form also the two curved ends 22a are shown as removable.

Now having described the invention and the preferred embodiment thereof, it is to be understood that said invention is to be limited, not to the specific details herein set forth, but only by the scope of the claims which follow:

What I claim is:

1. A vehicle brake testing tool for indicating the braking effect upon a wheel, comprising a contractible yoke adapted to span the wheel and grip the periphery thereof, a rigid arm rotatably mounted on said yoke near the center thereof, reversible ratchet means connected therewith for prevention of rotation of said arm in a selected direction while allowing rotation in the opposite direction, crank means also rotatably mounted on said yoke and concentric with said arm, a second yoke carried by said crank means, resilient means embraced by said second yoke, and abutments carried by said arm and against which said resilient means acts to resist relative movement of said crank and arm, and means to indicate the force required to deform said resilient means and produce such relative movement.

2. A vehicle brake testing tool for indicating the braking effect upon a wheel, comprising a contractible yoke adapted to span the wheel and grip the periphery thereof, a rigid arm rotatably mounted on said yoke near the center thereof, reversible ratchet means connected therewith for prevention of rotation of said arm in a selected direction while allowing rotation in the opposite direction, crank means also rotatably mounted on said yoke and concentric with said arm, a second yoke carried by said crank means, resilient means embraced by said second yoke, and abutments carried by said arm and against which said resilient means acts to resist relative movement of said crank and arm, and means to indicate the force required to deform said resilient means and produce such relative movement, said indicating means also indicating the direction of relative movement.

3. A gauge for indicating relative movement of two elements comprising a rack on one of said elements, a frame carried by the other of said elements and supporting a gear meshing with said rack, a pair of hand supporting members rotatably mounted on said frame, each of said members including a projecting portion, a finger carried by said gear and adapted to coact with and move said projecting portions alternatively depending upon the direction of rotation of said gear by said rack, and a dial for indicating the amount of movement.

4. In a gauge for indicating relative movement of two elements, one of said elements having mounted thereon a frame including a plate, a dial thereon, said plate providing at its central portion a bearing, a hollow shaft in said bearing, said shaft having at its upper end an indicating hand, and at its lower end a disc portion, a second shaft having a bearing within the first and also provided at its top with an indicating hand and near its lower end with a disc portion contacting with the first such portion, means to rotate one of said hands in accordance with said relative movement in one direction and to rotate the other of said hands in accordance with relative movement in the other direction, and means coacting with said disc portions to maintain said hands fixed at the end of such rotation.

THEODORE A. MILUTIN.